May 24, 1966  B. TOCCI-GUILBERT  3,252,775
FOAMED POLYURETHANE ABRASIVE WHEELS

Filed April 10, 1962  5 Sheets-Sheet 1

INVENTOR.
Berne Tocci-Guilbert

BY
ATTORNEYS

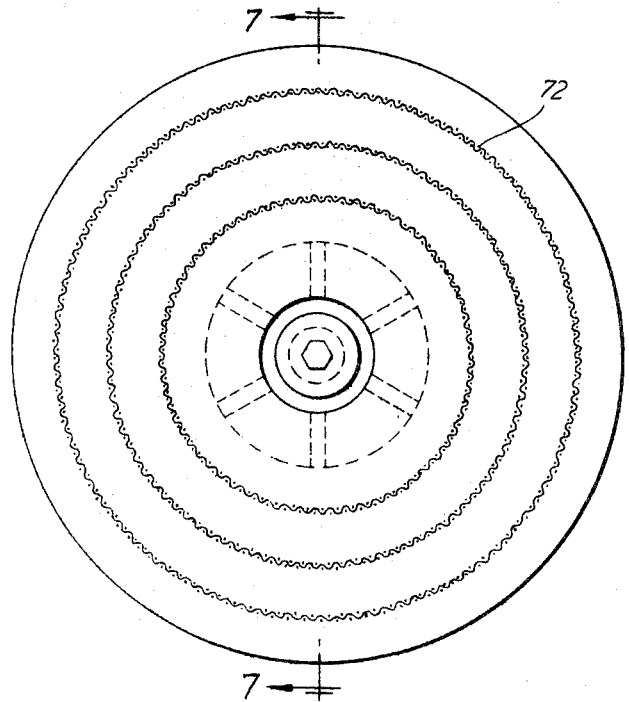
FIG_6_
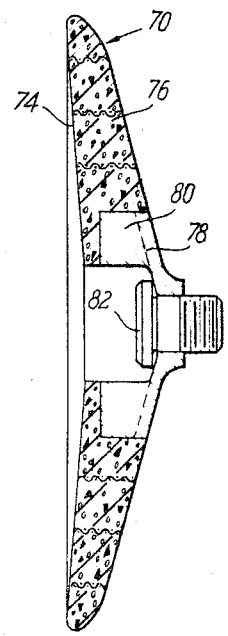
FIG_7_
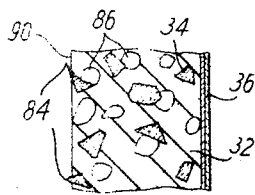
FIG_8_
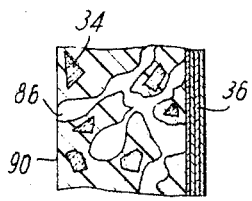
FIG_10_
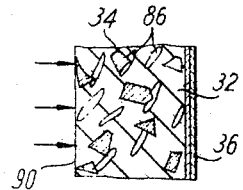
FIG_9_
INVENTOR.
Berne Tocci-Guilbert
BY
Flehr and Swain
ATTORNEYS.

May 24, 1966 B. TOCCI-GUILBERT 3,252,775
FOAMED POLYURETHANE ABRASIVE WHEELS
Filed April 10, 1962 5 Sheets-Sheet 3
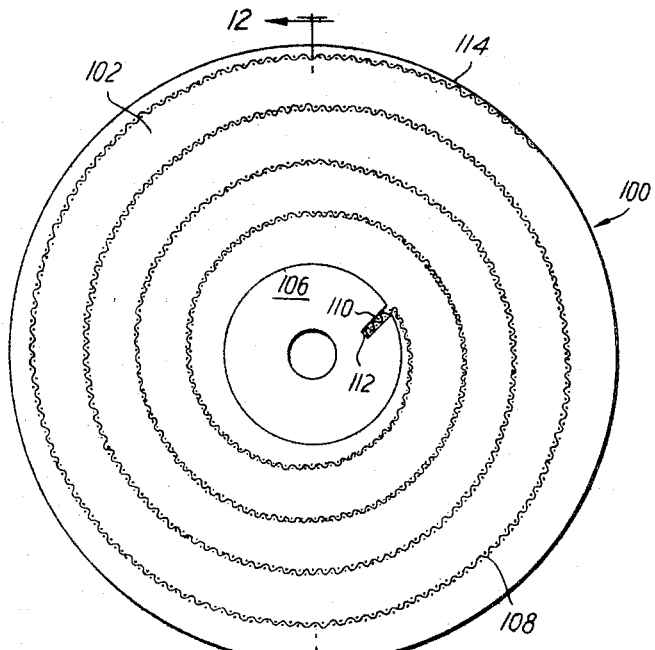
FIG_11_
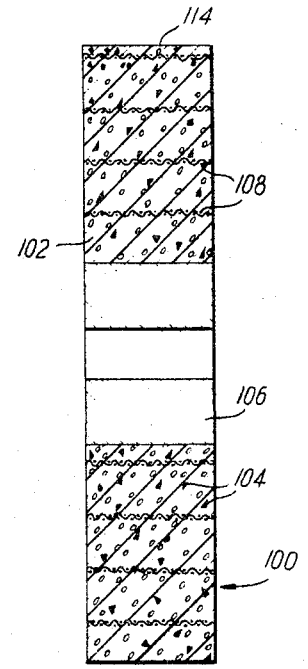
FIG_12_
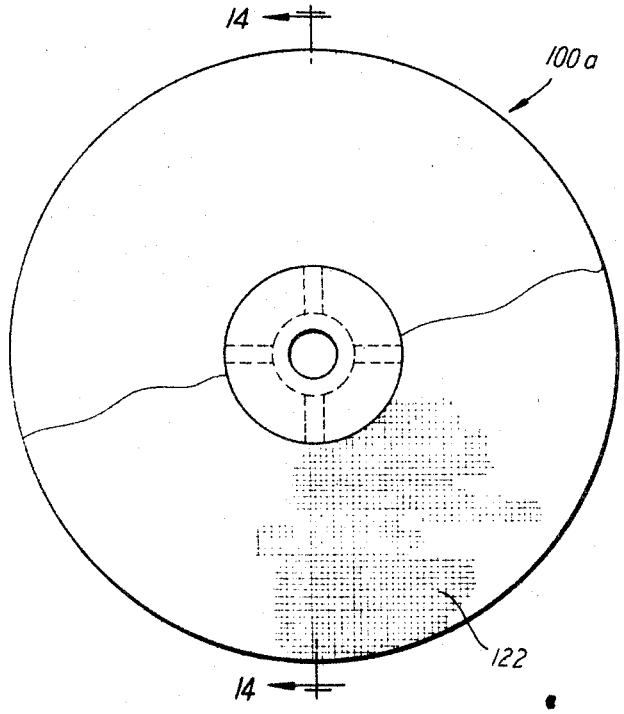
FIG_13_
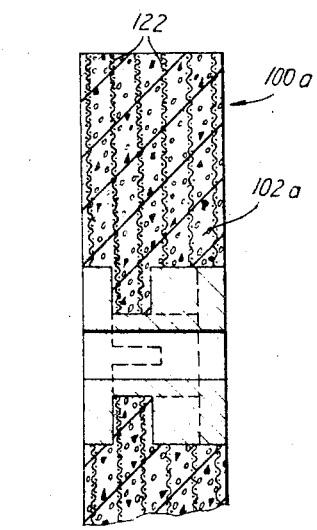
FIG_14_
INVENTOR.
Berne Tocci-Guilbert
BY
Hehr and Swain
ATTORNEYS.

INVENTOR.
Berne Tocci-Guilbert
BY
ATTORNEYS.

May 24, 1966 B. TOCCI-GUILBERT 3,252,775
FOAMED POLYURETHANE ABRASIVE WHEELS
Filed April 10, 1962 5 Sheets-Sheet 5
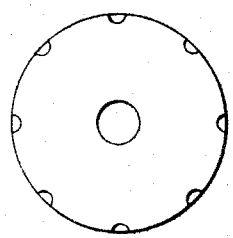
FIG_19_
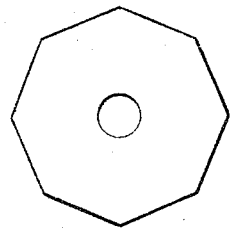
FIG_20_
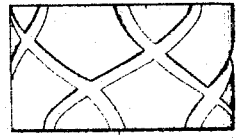
FIG_21_
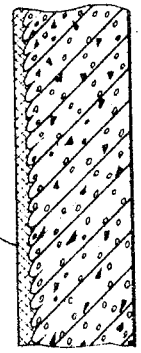
FIG_22_
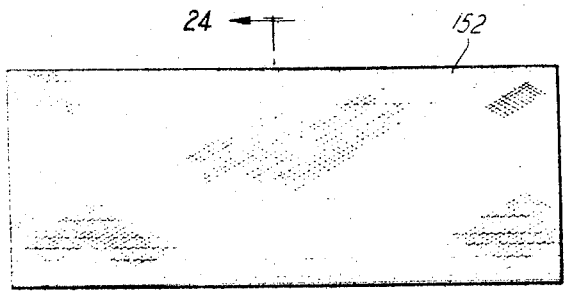
FIG_23_
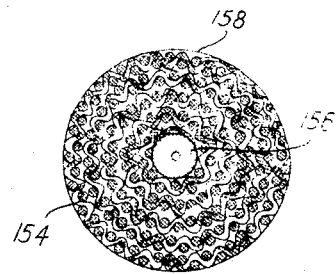
FIG_24_
INVENTOR.
Berne Tocci-Guilbert
BY
Flehr and Swain
ATTORNEYS.

United States Patent Office 3,252,775
Patented May 24, 1966

3,252,775
FOAMED POLYURETHANE ABRASIVE WHEELS
Berne Tocci-Guilbert, 2323 Larkin St.,
San Francisco, Calif.
Filed Apr. 10, 1962, Ser. No. 186,486
12 Claims. (Cl. 51—296)

This application is a continuation-in-part of my copending application Serial No. 715,695, filed February 17, 1958, now abandoned.

This invention relates generally to means for abrading and polishing surfaces, and particularly to means of this character employing abrasive foams wherein the abrading material is intimately and uniformly dispersed throughout a body substance which is both cellular and resilient.

A wide variety of commercial equipment is available for use in abrading and polishing surfaces, stock removal, and the like, and exists in various forms (e.g., rotary, continuous belt, reciprocating, etc.). The rotary devices of this character generally employ wheels or discs of two types, "coated" or "bonded." A "coated" abrasive is one in which the particles of either abrasive or polishing media are present as a thin coating on the surface of a body material which may be paper, cloth, netting, or the like, and are bonded to the body material by suitable adhesive or binder vehicle. A "bonded" abrasive is one in which the abrasive is dispersed within the bonding vehicle which is preformed into various solid shapes and cured or otherwise solidified for use in the solid form.

While abrasive and polishing means of the above types have been used for many years, they have not been entirely satisfactory for many commercial applications. Thus, the coated abrasives are not satisfactory for many uses because the "coating" wears off revealing the underlying body material, thereby providing a non-uniform abrading and polishing surface. The bonded abrasives are generally dense, hard solids (e.g., the so-called rubber wheels with bonded abrasives), which become even harder in use, and tend to be satisfactory only in the grinding of "high spots." In general, neither of these two basic forms is "cellular" in physical structure, in the sense that this term is generally used and understood, and consequently tend to hold the abrasive particles on the surface in such way that undesired "scratch" patterns are produced on the work surface. Furthermore, their abrading surfaces tend to clog easily, especially when applied to aluminum, coated surfaces, wood, and other soft surfaces, causing "smearing" of the work surface. Thus, "clogging" and "smearing" are two causes of excessive heating and consequent "breakdown" of bonded body components, as well as damage to the work surface. An additional problem is that further use of the clogged surface is obtainable only through expensive, time-consuming "refacing" operations, and only then in the case of the bonded abrasive. The more frequent remedy is to discard the abrasive unit altogether, and to replace it by another.

It is to be noted that each of the above major forms of abrading or polishing means is intended primarily for the removal of material or stock, and none is suitable for the particular operations contemplated herein of graining, re-graining, buffing, polishing, and burnishing.

In the polishing art, particularly, cotton wheels are used in an attempt to obtain some degree of yieldability. These wheels are generally prepared by the operator, who dips the peripheral surface of the wheel in glue, dusts the sticky surface with either an abrasive or a polishing material, and permits the glue to harden. The resulting surface presented to the work is similar to that of a coated abrasive, in that it is hard and unyielding, despite the fact that the cotton wheel is itself somewhat yieldable. More important is the fact that cotton wheels are effective in use only for a short period, and several are required by a single operator in a day's work.

In recent years, some work has been done with "foamed" abrasives in an effort to obtain some degree of yieldability. These efforts have been almost entirely limited to scouring pads, or similar hand-held devices of limited usefulness (note British Patent 716,422). This is because the foam matrix by its very nature is inherently weak as a body material, and is incapable of withstanding the internal forces in use which tend to distort and disintegrate the foamed structure. This is particularly true in the case of wheels employed in high speed rotary operations which results in ballooning of the wheels or disruptive forces which otherwise render the wheels ineffective for actual use.

Some further attempts have been made to overcome the above difficulties by densifying the foam (note U.S. Patent 2,885,276) but these efforts have been found to intensify the internal destructive potential in rotary operations, or to produce a wheel so densified so as to be subject to the same difficulties encountered with "bonded" abrasive wheels (i.e., "clogging," "smearing," utility limited to abrading of "high spots," etc.).

A further difficulty of particular importance is the inability of prior abrading devices to provide a necessary "hardness" of the exterior abrading surface, consistent with a desired yieldability and resilience to conform to and flow over irregular shapes, such as extruded metal surfaces, curved surfaces, and the like.

In general, it is an object of the present invention to provide improved abrading and polishing articles which solves the above problems, yet which are essentially cellular in structure so as to be both light in weight and yieldable and resilient.

Another object of the invention is to provide improved abrading and polishing articles which are capable of continued prolonged use in extremely high speed operations, including rotary operations at high rotational speeds.

Another object of the invention is to provide abrading and polishing means of the above character which are capable of being selectively employed in surfacing flat or irregular surfaces.

Another object of the invention is to provide abrading and polishing means of such character which are yieldable and resilient, and which contain abrading materials uniformly dispersed and distributed throughout the body portions thereof.

Another object of the invention is to provide abrading and polishing means of such character which also contains waxing, polishing, lubricating, treating and/or other modifying materials in addition to the abrading materials.

Another object of the invention is to provide abrading and polishing articles of foamed plastic material which can be controlled as to the degree of porosity and cell size of the voids, as well as the density of their body material, to thereby provide control over their pliability over a wide range of operating requirements.

Another object of the invention is to provide such abrading and polishing articles of foamed plastic material which can be controlled with respect to the respective size and percentage of distribution of the abrasive or polishing media relative to the porosity or cell size of the cellular body materials.

Another object of this invention is to produce an article of the type described which may be molded and formed into required shapes without great pressure or heat, and thereby eliminate the cost and labor involved in preparing and using expensive dies, processes, and molding equipment, while at the same time presenting articles which are so uniform and so integral that they are safe to use even at high rotational speeds.

Another object is to provide articles of such character capable of use on relatively soft metals, woods, and similar materials, with virtually no tendency toward "clogging" or "smearing" of the abrading and polishing surface.

It is another object of the invention to provide abrading and polishing articles of such character which will accomplish their intended purpose with a minimum of surface marking on the working surface in the form of scratches, marks, grooves, etc., and which will do so efficiently and effectively at rotational speeds which are but a fraction of those now generally employed.

It is still another object of the invention to provide such abrading and polishing articles which are simple in construction and which will accomplish their intended purpose with relatively light pressure compared to the heavy abrading pressures now required.

A further object of the invention is to provide such articles of composition and matter in the shape of discs, wheels, hand rubs, cones, belts, or in any shape desired, for the purposes described.

Additional objects and advantages of the invention will appear from the following description in which the preferred embodiments have been set forth in detail in conjunction with the accompanying drawing, in which:

FIGURE 6 is a plan view of another full face embodiment of an abrading wheel, in accordance with the present invention;

FIGURE 7 is a view in section along the line 7—7 of FIGURE 6;

FIGURE 8 is a detail view, along the line 8—8 of FIGURE 3, illustrating an essentially unicellular structure of a body material in accordance with the invention;

FIGURE 9 is a like view illustrating the use and deformation of the cellular body material, under the pressure of an abrading or polishing operation, and further illustrating the ability of the abrasive particles to retract within the body material;

FIGURE 10 is a view like FIGURE 8 illustrating an intercommunicating cell structure of a body material in accordance with the invention;

FIGURE 11 is a plan view of another embodiment of the invention, in the form of a wheel, wherein the peripheral face of the wheel is intended to be applied to the work, and showing the reinforcement in the form of an outward clockwise spiral;

FIGURE 12 is a view in section along the line 12—12 of FIGURE 11;

FIGURE 13 is a view like FIGURE 11 showing a further embodiment of the invention wherein the reinforcement is arranged in transverse spaced planes;

FIGURE 14 is a view in section along the line 14—14 of FIGURE 13;

FIGURES 19 and 20 are plan views of hub structures useful with wheels fabricated in accordance with the invention;

FIGURE 21 is a view in side elevation of the hub of FIGURES 19;

FIGURE 22 is an enlarged fragmentary view of sheet material faced on one side with a body material of the invention;

FIGURE 23 is a view in side elevation of a further embodiment of the invention, in the form of an elongated cylindrical wheel, wherein the reinforcement is impregnated with the body material of the invention; and FIGURE 24 is an end view of the cylindrical wheel of FIGURE 23.

Figure 1:
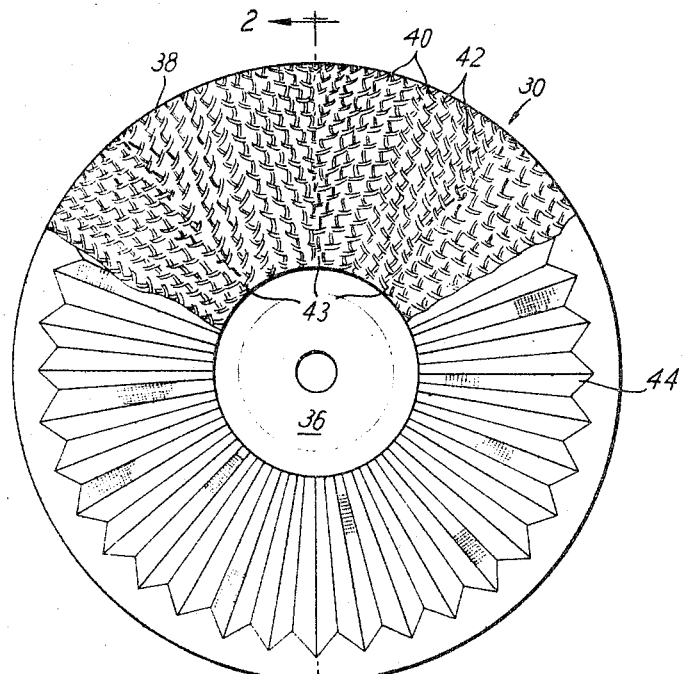
FIGURE 1 is a plan view showing a wheel structure in accordance with the present invention adapted for use in both full face surfacing as well as peripheral operations, and showing a portion of the face thereof broken away to reveal the underlying reinforcing structure.

Generally stated, the present invention is directed to improved means for abrading or polishing surfaces making use of a body of resilient cellular plastic (i.e., essentially polyurethane foam or other material of similar characteristics) containing a substantially uniform dispersal of abrasive grit. The invention is particularly concerned with rotary devices of this character (i.e., wheels, discs, cylinders and the like) formed of the abrasive foam and suitably reinforced with fibers, porous webs, fillers and other materials adapted to impart desired characteristics and to prevent distortion or disintegration of the devices during use.

The resilient, abrasive foams of the present invention are characterized by an essentially cellular structure (unicellular or interconnecting), and by the fact that individual particles of abrasive material are adapted to be positively retained within the cellular plastic body in such fashion as to be retractable during use (note FIGURES 8 and 9). This is a feature of importance to applicant's invention, because the retractile retention of the abrasive particles within the foam permits the abrasive to be forced back or retracted within the flexible body material during use to provide substantially uniform, reproducible scratch patterns throughout a wide range of normal working pressures. In other words, variation in working pressure will not alter the scratch pattern, but will merely cause the grit particles to be further retracted or compressed within the body material without disturbing the bond. The outward thrust or pressure exerted by the abrasive particles thus remains substantially the same throughout the abrading and polishing operation.

Resilient cellular plastics particularly suited for use in the present invention include the polyurethane foams (i.e., derived from isocyanate resins). Best results have been obtained with the polyurethane foams due to their extreme resistance to abrasion, their light weight coupled with high strength, their excellent heat resistance, their resistance to water, oil, solvents, and their compatibility with various chemical additives such as waxes, lubricants, detergents and other similar materials used commercially in abrading and polishing operations.

The polyurethane foams are especially adaptable to molding to any shape, without great heat or pressure, can be simply and inexpensively handled during molding, and additionally exhibit an extreme versatility in formulation to meet varying industrial abrading and polishing requirements. Thus, as will appear, the formulation of the polyurethanes can be very carefully controlled to provide foamed plastics of desired essential characteristics, including: desired cell sizes (i.e., ranging from 0.005 to 0.125 inch); a desired proportion of void space, in the form of cells, to the total volume of the body (i.e., ranging from at least 15% to no more than 85%); essential toughness or hardness for use in particular operations; the formation of tough, outer "skins" for certain uses; an adaptability to receive inert fillers to increase flexibility, heat resistance, or lubricating characteristics; and so on. In short, by merely varying the chemical formulation prior to molding, abrasive cellular plastics can be created for use in a wide range of industrial operations.

Additional advantages in the use of the flexible abrasive foams of the invention can be obtained by improvements in the construction of particular abrading and polishing devices, including specifically improvements in the manner of reinforcing and the surface configuration of the working surfaces of such devices, as will hereinafter appear.

Figure 2:
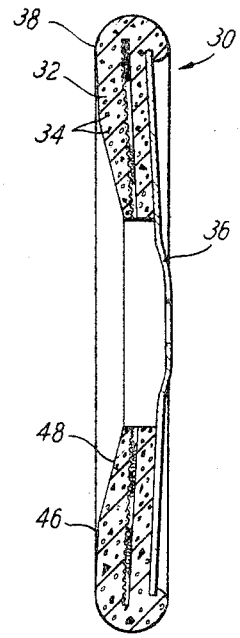
FIGURE 2 is a view in section along the lines 2—2 of FIGURE 1.

Referring to FIGURES 1 and 2, 30 represents a particular embodiment of an abrading and polishing device, in the form of a surfacing wheel, generally embodying the body of resilient cellular plastic described heretofore. As shown in FIGURE 2, the main or body portion 32 of the wheel is composed of a molded cellular foamed plastic which preferably is a foamed polyurethane. Extending throughout this cellular plastic body is a substantially uniform dispersal of abrasive grit 34, which may be any commercially available abrasive material (natural or synthetic). Suitable abrasive materials of this type include finely divided Carborundum, corundum, aluminum oxide, silicon carbide, silicon, garnet, diamond bort, volcanic ask, pumicite, pumice, Fuller's earth, and the like. Preferably this grit is of an average size slightly greater than the average size of the cells in the foam (i.e., ranging from about 0.01 to 0.130 inch). This relation between the size of the grit particles and the individual cells of the plastic foam insures a desired bonding of the abrasive within the body material (with no possibility that the abrasive particles will be merely trapped within the cells during molding) without, however, detracting from the essential retractile characteristic of the abrasive.

In the embodiment of FIGURES 1 and 2, the wheel is shown supported and securely bonded to a rotary support or backing 36. This backing can be of any suitable construction such as molded plastic, metal, or the like. It may also be of laminar construction, for example layers of plastic, impregnated cardboard, paperboard, or other fibrous material. The latter construction is not only strong, tough and relatively flexible, but permits the backing to be very inexpensively fabricated to varying thicknesses (e.g., as in FIGURES 8 and 10). A variation in thickness or number of layers in the backing permits a degree of control over the relative stiffness strength, and yieldability of the backing, and consequently the article 30, for particular operations. Thus, use of laminar backing pads of varying diameters and thicknesses permits the operator to obtain a desired variation in the flexibility of the wheel which, coupled with the inherent resiliency of the body portion 32, permits use of the wheels in varying operations such as regraining of flat surfaces, or contour work such as finishing the surfaces of boat hulls, and other curved or irregular surfaces.

Referring particularly to FIGURE 1, the outer face of the wheel is formed to provide a roughened abrading surface 38 having external channels 40. Preferably, these channels extend radially outward relative to the axis of the wheel and thereby facilitate removal of material abraded from the workpiece. In the illustrated device, the outer surface conforms to a rough textured, woven surface, providing ridges or high spots 42 between the channels 40, and includes a series of radial sections 43 extending about the wheel. In use, material abraded from the surface of the workpiece by the high spots or ridges 42 moves into the channels 40 and is expelled outwardly by centrifugal force. The device of FIGURE 1 thus particularly overcomes the problem of "clogging," which has hampered the use of so many prior devices.

As best shown in FIGURE 2, the wheel 30 is generally reinforced by a pleated, porous web 44 lying generally in the radial plane of the wheel. The member 44 is preferably an open-mesh "coated" abrasive, sometimes referred to in the trade as "grit-cloth" or "screen cloth," or a similar flexible coated abrasive. Such materials are generally fabricated of glass or nylon fibers or strands, coated in conventional fashion with a suitable abrasive material (i.e., as specified above). As used in the device of FIGURE 1, the pleated reinforcement 44 is positioned within the mold prior to curing so that the foam plastic flows around in between the interstices and openings of the mesh, thereby firmly bonding and impregnating the reinforcement within the body material. The reinforcement 44 should consequently be fabricated of materials which are fully compatible with the composition of the plastic foam, whether polyurethane, epoxy, or vinyl.

The device shown in FIGURE 1 is particularly adapted for use on a suitable portable tool, wherein the abrading surface is carried to the work. Upon flat surfaces, the construction of the face is such that the downward pressure at the center of the device will cause a flattening of the outer peripheral work face, represented at 46 in FIGURE 2. Thus, in a typical embodiment, this work face might be tapered approximately 3° inwardly from the radial plane of the face, whereas the inner surface 48 might be tapered as much as 15°. Depending upon the amount of pressure exerted, either or both of the faces 46, 48 can be flattened against the workpiece without producing undesired scratch patterns, due to the inherent retractile characteristic of the abrasive, and also the flexibility imparted to the wheel by the resilient cellular structure of the foamed plastic body 32. To some extent, flexibility is also imparted to the wheel by the resilience of the backing 36.

In use, the face of the wheel continuously acts to expel stock removed from the workpiece, in a radial direction, due to the centrifugal forces of rotation. At the same time, the reinforcement 44 avoids any tendency of the wheel to distort (e.g., "balloon"), and effectively resists any possibility of disintegration (e.g., "blow out"). When used upon irregular shapes, such as extruded metal forms or similar non-uniform surfaces, the inherent flexibility of the wheel permits the face 38 to flow or slide over the surface of the workpiece, without any tendency to leave deep scratches, marks or grooves, which must be subsequently removed in further accomplishing polishing or buffing. The wheel of FIGURES 1 and 2 is thus ideally suited to virtually any abrading or polishing operation including graining, regraining, buffing, polishing, burnishing, etc., or the performance of jobs now considered impossible or at least limited to hand operations.

Figure 3:
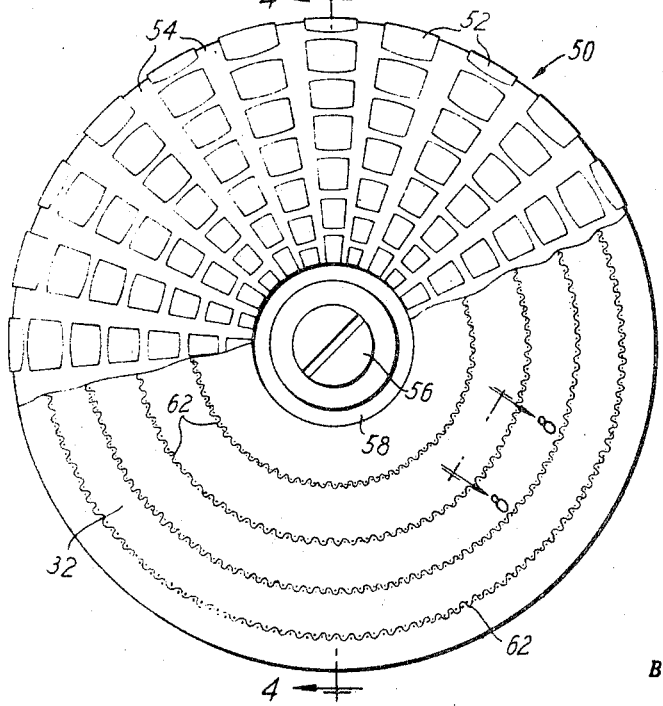
FIGURE 3 is a plan view like FIGURE 1 showing another embodiment of the invention in the form of a wheel in which the wheel comprises a body portion and an outer envelope portion.
Figures 4, 5:
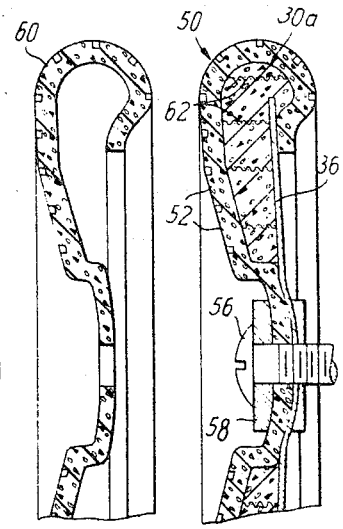
FIGURE 4 is a fragmentary view in section along the line 4—4 of FIGURE 3.
FIGURE 5 is a view like FIGURE 4 of a modified envelope construction for use with a wheel as shown in FIGURE 4.

FIGURES 3 to 5 illustrate a further embodiment of the invention in which an outer "envelope" 50 of the abrasive foam material is provided, in a position overlaying a wheel of the general type illustrated in FIGURES 1 and 2. The purpose of such envelope construction is to permit a quick change in the abrasive or polishing characteristics of the wheel, say in a portable unit, by simply replacing one envelope with another. Thus, a single wheel might be used in conjunction with a single motor and several "envelopes" to provide all the necessary variations in abrading and polishing characteristics for a particular industrial operation. By way of illustration, a first envelope might be constructed of a relatively hard, tough abrasive foam, and employ a comparatively hard, coarse dispersion of abrasive grit. Such envelope, which might be of the type shown in FIGURES 3 and 4, could be used in initial stripping or plating operations, involving light stock removal, or other similar surface work. When this first operation had been completed, the first envelope could be removed and replaced by a second envelope of different characteristics, for example, relatively soft and elastic and containing a comparatively softer, relatively fine grit. Such envelope might be of the type shown at 60 in FIGURE 5. Being resilient and flexible, these envelopes could be quickly slipped off and on the wheel 30, and clamped in place by the retaining nut 56 and retaining plate 58. The device, fitted with the envelope 60, could then be operated in the final abrading, polishing and burnishing of the workpiece. Alternatively several operations could be performed using envelopes of varying, progressive characteristics, as necessary in an industrial application.

FIGURES 3 and 4 also illustrate a modified surface configuration of an abrading device, either wheel or envelope, wherein the contacting surface portions 52 are arranged in staggered relation to provide radial channels 54 adapted to permit removal of stock abraded from the workpiece. The wheel 30a shown in these views is essentially the same as the wheel 30, shown in FIGURES 1 and 2, except for the use of reinforcement 62 in the form of a series of concentric rings. These rings can be fabricated of "coated" abrasive, screening, burlap, open weave cotton, cocoa matting, etc., as before. The reinforcement might also be in the form of a dispersion of fibers, such as glass, rayon, or nylon fibers, or take any other suitable form such as net, fabric, etc. As noted above, the essential purpose of reinforcing is to insure the integrity of the wheel 30a to thereby overcome the difficulties of the prior art (e.g., "ballooning" or "blowing out"). The reinforcing thus functions to overcome the effects of centrifugal force and high speed rotation on the resilient relatively soft materials, especially when such materials are loaded with a dispersion of abrasive grit.

Referring to FIGURES 6 and 7, 70 indicates an abrasive wheel or disc of the above type in the form of a conventional back pad, reinforced with concentric rings of coated abrasive 72 or other suitable reinforcing material. The wheel 70 is not intended as a back pad, but is the abrasive article itself, just as in the case of the wheels 30 and 30a. As shown, it comprises a slightly dished face or work surface 74, with the body 76 diminishing in thickness from the central hub 78 outward. The hub 78 may be provided with a plurality of radial vanes or ribs 80, which together with the hub are embedded in the body material 76 at the time of forming or molding. A standard retaining nut 34 may be used to secure the wheel 70 to a resilient oscillator of the type shown, for examples, in Patent Nos. 2,633,008; 2,767,527 and 2,767,528. Although concentric reinforcement is shown, any suitable form can be employed, for example, as in the case of the wheels in FIGURES 1 to 5.

The wheel 70 likewise has the advantage of responding to varying pressure to provide a flattened surface for contact with the work. Further variations in pressure can increase or decrease the surface applied to the work within the limits of the resiliency of the body material 76. However, with the abrasive foams of the present invention, there is no need for heavy pressures against the workpiece, as light pressures are just as effective as heavy pressures in ordinary practice.

The abrasive foam wheels of FIGURES 1 to 7 have been found to be particularly successful in full face grinding operations, with either portable or stationary equipment. Specifically, the cooperation between dispersal of abrasive grit and the cellular body of the foamed plastic contributes many unexpected and highly desirable results. In contrast to the coated or bonded abrasives of the prior art, wherein the grit particles are bonded within or upon an inflexible solid mass, the grit particles 34 of the present invention are resiliently retrained and are retractile. As a consequence, there is no visible change in the desired scratch patterns obtained even when considerable variation is made in the pressure forcing the abrasive body against the workpiece. This feature of the invention will be clearly understood by reference to FIGURES 8 and 9. Thus, FIGURE 8 shows a section of the foamed body material 32 supported upon the backing pad 36. The abrasive particles 34 adjacent the work surface, through wear or in the initial molding, frequently present protruding sharp points or projections, as indicated at 84. However, upon application of an abrading or polishing pressure, as in FIGURE 9, the retractile nature of the grit particles permits these projecting points to retract into the void spaces provided by the cells 86, without in any way disturbing the bond between the particles and the cellular foam. The abrasive foam composition thus functions, unlike any other type of abrasive composition, to exert a substantially uniform pressure upon the surface of the workpiece. Moreover, with the devices of the invention, this pressure remains substantially the same over a rather wide range of operating pressures, thus insuring substantially uniform scratch patterns throughout such range of operating pressures. It is only when a gross change in the operating pressure takes place that an observable difference in the scratch pattern is observed, and even then the difference is generally small. Also, it has been observed that the retractile movement of the abrasive particles arising through normal changes in operating pressure, serves to expel foreign matter and to clean the work surfaces 90 of the abrasive foam units, insuring that these surfaces will not become clogged or fouled.

It will be noted that FIGURES 8 and 9 illustrate the use and operation of an abrasive foam of substantially unicellular construction. However, substantially identical results are obtained when use is made of an intercommunicating cellular construction, as shown in FIGURE 10. FIGURE 10 also shows the use of a back pad 36 of multilaminar construction, there providing increased stiffness to the abrasive articles.

FIGURES 11 and 12 illustrate an abrasive wheel 100 of substantially cylindrical configuration. This wheel likewise employs a main body portion 102 of resilient essentially cellular plastic containing a dispersal of abrasive grit particles 104. In this case the wheel is formed or molded around a central hub 106, adapted to be secured to the driving shaft of a motor for rotation in an abrading or polishing operation. Normally the shaft of the motor passes through the central aperture of the hub and is engaged therein for rotation without slippage. In use, the shaft might be the direct shaft of the motor or the remote end of a flexible shaft, depending upon the particular operation. Wheels of the type shown in FIGURE 11, and also in FIGURES 13 to 17 are frequently referred to as "set up" or "snagging" wheels and are widely used in many abrading or polishing operations, such as stripping, plating, snagging work, polishing, light stock removal, and other surface work wherein the peripheral surface of the wheel is engaged with the workpiece.

In order to insure the integrity of the cylindrical wheels against any deformation or possibility of disintegration, particularly at relatively high rotational speeds, it is essential that these wheels be suitably reinforced in the manner generally indicated above. Such reinforcement can include any of the "coated" abrasives or fabrics (e.g., "gritcloth," "screen cloth," cocoa matting, etc.) or loose fibrous reinforcing materials (e.g., glass, nylon, rayon, cellulose, jute, cotton, hemp, etc.) so far disclosed. It will be understood that the reinforcing in the cylindrical type wheel operates to prevent any irregular increase on the peripheral face, in the form of an eccentric arc or protrusion, which would cause a shift or change in the diameter of the wheel to present only a small peripheral portion of the wheel to the work.

As particularly shown in FIGURE 11, the wheel 100 is reinforced by means of a coated abrasive or other fabric 108 molded within the body material in the form of a spiral, with the inner end 110 secured in a vertical or axially aligned peripheral slot 112 in the hub 106. However, any suitable method of securing the end of the material 108 on the hub can be employed. Since most rotating tools have a clockwise rotation, it is preferable to have the spiral reinforcement also moving clockwise from the center outwardly. It will be observed that the spiral reinforcement will continue to perform its functions as the peripheral surface 116 of the wheel 100 wears in use. Only a very small portion of the material 108 will be exposed at any one time and whatever portion is exposed is not enough to cause any uneven effect in the use of the wheel 100. In high speed operations, the reinforcing effectively restrains the body material from shifting outwardly by confining the cellular material against the effects of centrifugal force, with each successive layer being not only self-restraining but also serving as a deterrent to outward movement of the layers therebelow.

Figure 15:
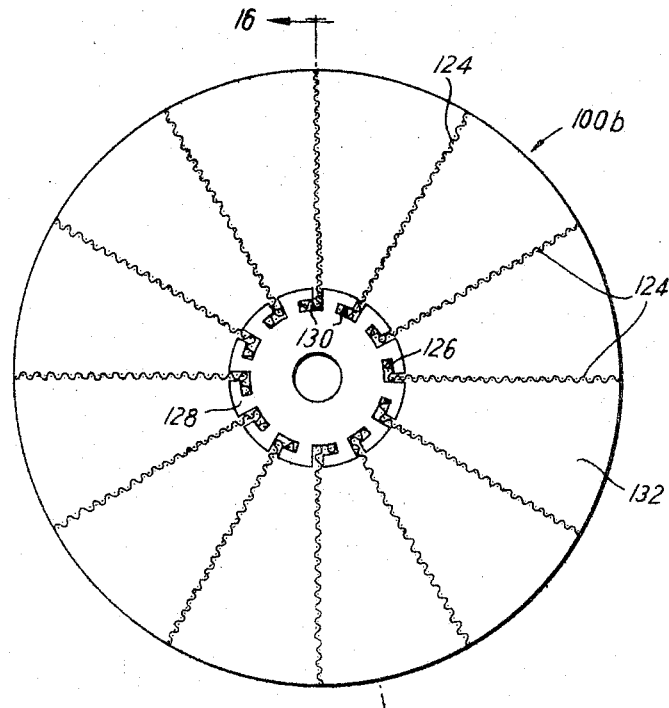
FIGURE 15 is a view like FIGURE 13 wherein the reinforcement extends radially from the hub.
Figure 16:
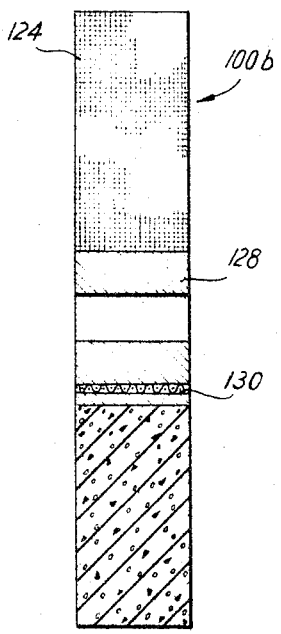
FIGURE 16 is a view in section along the line 16—16 of FIGURE 15.
Figure 17:
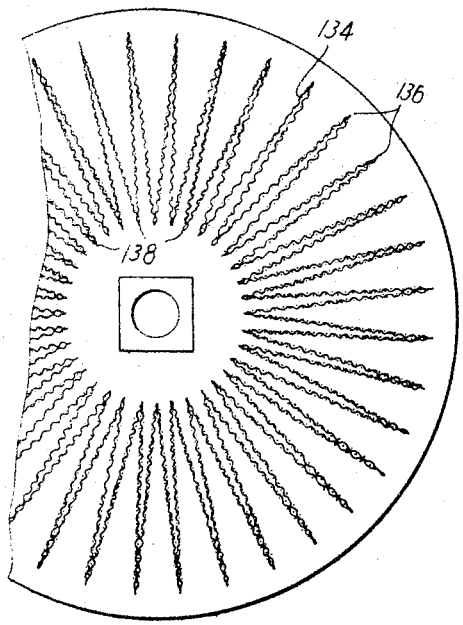
FIGURE 17 is a view like FIGURE 13 wherein the reinforcement is radially arranged, permitting fabrication from a single strip of reinforcement material.

Further methods of reinforcing cylindrical wheels of the type shown in FIGURES 11 and 12, are shown in FIGURES 13 to 17. In the wheel of FIGURES 13 and 14, the reinforcement 122 is shown in the form of a woven coarse mesh ("grit-cloth" or other coated abrasive, fiber glass screening, etc.) spaced in planar or laminar relation relative to the axis of the wheel. In FIGURES 15 and 16, the reinforcing material 124 is positioned radially with the inner ends 126 suitably connected into the hub 128, for example, by means of the L-shaped slots shown at 130. Here again, the reinforcing members are molded or formed within the body material 132. In FIGURE 17, the reinforcement is formed as a single continuous member 134 which may be fabricated from a single strip of coated abrasive, glass fiber screening, open weave cotton, burlap, or the like. It will be understood that the strip is creased or folded at the points 136 and 138 to form the radiating, star-shaped configuration illustrated.

In the wheel constructions mounted on a central hub, it is essential that the body material be integrally bonded to the hub, in such fashion that the wheel will rotate without slippage. Various successful hub constructions are shown within the wheels illustrated in FIGURES 11 to 17, and separately in FIGURES 19 to 21. Thus, in FIGURES 11 and 15, the body is held to the hub at least in part by the reinforcement. In FIGURES 17 and 20, hubs are shown which hold the body against slipping by virtue of the irregular configuration of their outer surfaces. The hubs shown in FIGURES 7, 14 and 19 to 21 hold the body material against slippage by virtue of protruding vanes or ribs or grooves or passageways extending into the hub. After bonding, the interlocking of the material with these surface irregularities on the hub additionally provides a secure attachment. It will be understood that the illustrated hubs are only indicative of various ways for keying the hub to the body material, during the forming or molding process.

Figure 18:
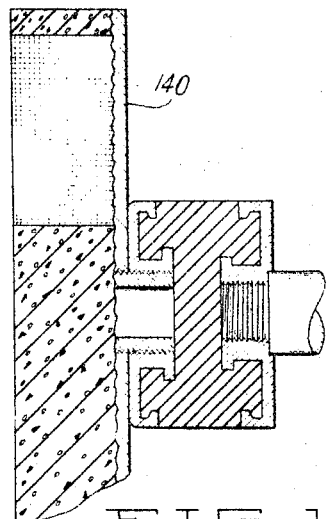
FIGURE 18 is a view in section of a further embodiment of the invention wherein an abrading wheel is mounted on a rigid disc for full face surfacing operations, and in the manner adapted to use in stationary installations.

As generally indicated above, the wheels of FIGURES 11 to 17 are cylindrically formed around a central hub, and may be of substantially uniform thickness with the hub. Such wheels are intended to have outer peripheral surfaces which function as the working face. Obviously the thickness of these cylindrical wheels, regardless of diameter, can be extended to any suitable size, either as a single mold (note for example the cylindrical wheel of FIGURES 23 and 24), or as a multiple unit in laminated form. Moreover, the cylindrical wheel structures described herein can be just as effective for full face grinding and finishing, as they are for peripheral operations. By way of further illustration, FIGURE 18 discloses a cylindrical wheel mounted on a backing of metal or other suitable stiffening material 140. Such a wheel would be particularly satisfactory for use in full face abrading and polishing operations, on a stationary mount, for example as disclosed in Patent No. 2,486,078, and would provide an uninterrupted work surface for such use. These and other variations are clearly within the scope and intent of the present invention.

In general, the body materials of the present invention (comprising a resilient cellular plastic containing a substantially uniform dispersion of abrasive grit) can be molded or formed in virtually any shape desired, large or small. The two general types of rotary devices illustrated in FIGURES 1 to 10 and 11 to 17 are merely indicative of the flexibility of form. For belts or sheets, as generally illustrated in FIGURE 22, the body material can be formed onto a backing or reinforcing material 150 which may be fibrous or nonfibrous. The forming of the body material into continuous belts or sheets of this type could follow the standard practice. Obviously, if two surfaces are desired, the reinforcing material 150 may be centrally located within the body material, or even formed on both sides thereof.

In FIGURES 23 and 24, an elongated cylindrical wheel 152 is shown. In the apparatus illustrated, the wheel is formed by coating an elongated strip of cocoa matting or burlap, or similar material 154, with a thick layer of uncured foamed plastic (e.g., polyurethane and the material subsequently rolled up into a tight spiral about a central mandrel 156 to form the wheel configuration. This has the effect of causing the layer of foamed cellular plastic material 158 to impregnate the interstices and openings between the fibers of the wound strip material to form a cohesive unit. The wheel can then be cured in a cylindrical mold to form a tough, abrasive outer surface. This type of wheel has been found to be extremely effective in the reconditioning of large flat surfaces, for example, in removing paint, rust, or the like, from steel decks, plates, etc.

A preferred cellular foamed plastic composition for carrying out the invention comprises the group of polyurethane foams. As indicated previously, such foams are generally derived from the isocyanate resins, and may be either rigid or flexible, hard and abrasive, or soft and resilient, depending upon components, filters, and method of foaming. In accordance with the invention, the conditions of foaming may be such that the degree of porosity (or proportion of gas cells within the foam) is such that the voil spaces within the cellular body constitute between 15 and 85% of the total volume of the body. Such void spaces can be in the form of substantially individualized cells (unicellular body) or in the form of generally open or interconnecting cells (porous or intercommunicating body). Although the foamed polyurethanes constitute a relatively new development in the field of plastics, considerable practical or empirical knowledge has been attained so that vast quantities of the polyurethane products are now sold annually.

In a strict chemical sense, a polyurethane results from the reaction of a simple di- or polyhydric alcohol with a di- or polyisocyanate, wherein the only repeating linkage present in the polymer chain is the urethane group indicated below:

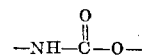

However, the commercial "polyurethanes" are complex reaction products of di-isocyanates and hydroxyl-bearing polyester or polyether resins and, as such, are more correctly desribed as poly(ester)urethanes and poly(ether)urethanes, respectively. The present invention can be satisfactorily practiced with foams of both the poly(ester)-urethane or poly(ether)urethane type, and the term "polyurethane" is consequently used herein in this broad general sense.

To form a polyurethane foam for molding or forming into one of the articles described above, a polyether such as polypropylene glycol, or a propylene oxide derivative of glycerol or sorbitol, a polyester, or similar material is treated with a diisocyanate in the presence of some water and a catalyst (amines, tin soaps, organic tin compounds) as well as fillers, dispersing and emulsifying agents, and other substances. Simultaneously with the polymer-forming reactions, the water reacts with the isocyanate groups to cause cross linking and curing, and also produces carbon dioxide which causes foaming. In other cases trichlorofluoromethane or similar volatile material is incorporated to serve as blowing agents, and to reduce the thermal conductivity of the finished foam.

The flexible, cellular foams when formed into abrasive articles as described above, suitably reinforced with fibers, fabrics, etc., possess great strength and durability at little increase in weight. They are unusual in their properties of high strength, heat resistance, resistance to water, oil, solvents, and abrasion. They also are good shock absorbers (i.e., absorb energy without bounceback) and can be made in various degrees of softness or hardness. They are particularly adaptable to extensive modification of properties by relatively simple variations in their formulation, and by the addition of suitable fillers, chemical additives, and the like.

The degree of porosity and cell size of the flexible foams is controlled by the amount of blowing agent (i.e., water and/or trichlorofluoromethane) added to the resin, and by the types and amounts of surfactants (i.e., sulfonated castor oil, sulfonated fatty acids and other ionic surfactants) and nonionic cell stabilizers (silicone oils and silanol-polyol copolymers) employed. In general, and within certain limits, the greater the amount of surfactant or cell stabilizer, the finer and more uniform the cell. The porosity and cell size within the plastic foam can also be controlled to some extent by the degree of loading of the mold, with respect either to the amount of resin employed or the amount of various fillers and additives.

It is also possible to formulate the initial polyurethane foam compositions to obtain flexible body materials having a tough or friable outer skin. In general, skin formation and/or internal matrix characteristics are determined largely by the type of resin, isocyanate and curing agent used. Thus, tough flexible products are obtained with the use of linear resins having hydroxyl numbers in the range 50 to 70. If a high degree of branching or crosslinking is introduced into the polymer molecule through use of tri-, tetra- or pentafunctional resins, with hydroxyl numbers in the range 200 to about 700, the resulting product becomes stiffer and more friable. Similarly, an excess of diisocyanate introduces additional crosslinking through the formation of allophanate, biuret and urea linkages and leads to more friable products.

It is also possible to vary the formulation of the body material to control its toughness or hardness. The most common technique of measuring this characteristic in a flexible foamed plastic is "Shore" sleroscope hardness (i.e., employing the standard technique according to the American Rubber Manufacturers Association). In the polyurethane resins, Shore hardness is controlled principally by the proper choice of resin, isocyanate and curing agent. Of the three, resin is the most important control factor. Thus, linear resins of low (50 to 70) hydroxyl number yield soft polyurethanes. Within a given series, the higher the density, other factors being equal, the higher the hardness. Use of trichlorofluoromethane as an auxiliary blowing agent will yield a softer foam than one blown with water alone to the same density. Branched resins of intermediate to high (200 to 700) hydroxyl numbers yield relatively hard urethanes. 1,5-naphthalene diisocyanate and diphenylmethane-4,4'-diisocyanate form harder urethanes than toluene diisocyanate, other factors being equal. Linear amine curing agents yield harder urethanes than linear diol curing agents.

Various reinforcing fillers or chemical additives can also be incorporated in the polyurethane foams to significantly change their characteristics. Thus, reinforcing inorganic fillers such as calcium carbonate, titanium dioxide, silica, and the like tend to exert an abrasive action of their own and to assist in maintaining a uniform scratch pattern. As an illustration, 10 to 40 parts of calcium carbonate (minus 300-mesh) per 100 parts of resin has been found to be effective for this purpose. The kaolinite clays, aluminum silicate clays, and silica (ranging from 0.1 to 100 microns in size) provide desired results in portions ranging from 10 to 100 parts of resin. Titanium dioxide (paint grade) is effective within a range of about 5 to 15 parts per 100 parts of resin. Small amounts of carbon black (e.g., SRF, EPC, SAF and HAF) also provide a desirable result, and without any additional abrasive action.

In general, the reinforcing fillers or additives can be used singly or in combination, and serve to strengthen the polyurethane matrix, and to increase the Shore hardness of the finished products. As previously noted, the proportion of the abrasive grit can also be employed to vary the hardness, making it possible to proportion the respective amounts of abrasive grit and reinforcing filler to achieve a desired hardness as well as a desired abrasive action. Use of reinforcing fillers in the flexible urethane foams also leads to a more uniform skin surface, which is tougher than that formed with a non-loaded flexible urethane.

In addition it has been unexpectedly found that certain additives in finely divided or granular form, such as granulated cork, vermiculite, perlite, graphite, diatomaceous earth and the like, can be incorporated within the polyurethane foams to provide improved heat resistance, and/or lubricating characteristics. Granulated cork and vermiculite have proved to be particularly useful for this latter purpose.

In general, and assuming that the abrasive cellular foams of the present invention are formulated from a structurally reinforced resilient cellular plastic (e.g., polyurethane foam), a dispersed abrasive grit (e.g., finely divided Carborundum, aluminum oxide, etc.), and reinforcing fillers (e.g., calcium carbonate, titanium dioxide, etc.), the proportions may range as follows:

| Materials: | Percent |
| --- | --- |
| Cellular plastic | 20–90 |
| Abrasive grit | 10–80 |
| Reinforcing filler | 0–50 |

The cellular structure of the material is of further advantage in that it provides a means to effectively preload the abrasive foam with various chemical additives adapted to complement the abrasive action. It is specifically contemplated, for example, that liquid or solid, or semisolid, waxes, detergents, polishes, lubricants, preservatives (e.g., rustproofing), fixatives, etc. can be incorporated into the cellular structure either during the molding, so as to be encapsulated within a unicellular body as in FIGURE 8, or after the molding, by sponge action within an open or intercommunicating body as in FIGURE 10.

In general, the density of the abrasive body material is not critical to a successful practice of the invention. However, from a practical standpoint, foamed polyurethanes of a density lower than about 10 pounds per cu. ft. (exclusive of the abrasive) tend to have reduced tensile, tear and shear strengths. In like fashion, the upper useful limit of polyurethane foam is about 45 pounds per cu. ft. since above this limit, the foam tends to have a lower resiliency and a sufficiently high hardness to cause the abrasive to produce erratic scratch patterns or score marks on the workpiece. Within limits, these practical limitations on the foam density would apply to the abrasive loaded body materials without regard to the increased density imparted to the body by the abrasive grit. Thus, a polyurethane foamed body material containing an equal amount by weight of finely divided Carborundum or corundum would have a density of about 20 pounds per cu. ft., and a proportion of voids of the order of 80%. However, strength characteristics would be essentially those of a foam of 10 pounds per cu. ft. The same would be true of an abrasive foam wherein the proportion of grit was reduced to 1 part grit to each 3 parts of polyurethane foamed body material, although the density would be correspondingly reduced to about 13 to 14 pounds per cu. ft., and the proportion of voids increased to about 85%. Similar considerations would apply to use of a denser foam. Thus, assuming the use of a foam having a density of about 45 pounds per cu. ft., loaded with an equal weight of Carborundum or corundum, although the density of the resultant abrasive foam material would be approximately 90 pounds per cu. ft. (and the percent of voids of the order of 20%), the foam characteristics would still be essentially those related to the density of the foam itself (e.g., 45 pounds per cu. ft.).

As noted previously, the effectiveness of the abrasive foams of the present invention depends in large measure upon the average size of the cells and the proportion of void spaces in the foams, and not upon density. As a general rule of thumb, the proportion of void spaces constituted by the individual cells in the abrasive foam should range from about 15 to 85% of the total volume of the body. In such a body material, the final density will depend upon the amount of added abrasive. In general, this final density will vary from a value slightly greater than the density of the cellular plastic body material itself (e.g., 10 to 45 pounds per cu. ft.) to a point where the abrasive foam is too dense to provide a desired cell structure for proper resiliency (e.g., about 90 pounds per cu. ft.)

From the foregoing, it will be apparent that many advantageous properties are obtained through use of the resilient cellular body material of the invention, with its dispersed abrasive gift. For one thing, abrasive foam articles and devices made pursuant to the disclosure herein greatly relieve the strain and effort required of an operator in performing any abrasive or polishing operation. Since the scratch pattern is substantially the same for all normal operating pressures, the work can be accomplished with very little effort spent in applying or pressing the article on the work surface. In addition, the resiliency imparted by the cellular structure of the body material tends to counteract vibration and bounce of the devices as they are applied to the work.

A further advantage of the invention is the ability to use operating speeds which with the devices previously employed would have resulted only in clogging of the abrading surface or undesired scoring or marking of the surface of the workpiece. By way of illustration, abrading and polishing operations on relatively soft materials (e.g., plastics; pewter; zinc, lead or tin alloys; soft woods; etc.) can be effectively carried out at speeds as low as 100 r.p.m. up to about 1750 r.p.m., and will produce desired surface finishes with a controlled minimum removal of stock. Relatively higher speeds than possible heretofore can also be employed due to the reinforced nature of the herein disclosed devices, particularly rotary operations requiring speeds of the order of 6000 to 10,000 r.p.m. or higher (e.g., in regraining steels, refractory, etc.).

The nature of the combination between the resilient body material and its dispersed grit, is also such that wear is reduced to a minimum. This result is due to the inherent abrasive resistance of the polyurethane and other cellular plastic foams employed, and also to the retractile characteristic of the bond between the body material and the dispersed grit. On the other hand, it is equally apparent that the articles may be used continuously with continuously renewing surface until the body material is almost entirely worn away. Such continuous use in no way changes the operating characteristics of the articles, however, since the newly exposed surfaces possess identical characteristics to those worn away. Moreover, the devices retain the same flexibility and resilience, and resistance to ballooning and disintegration, throughout their usable lives.

Whereas it might be assumed that the cellular nature of this structure would fill and become fouled by the removed stock, the slight pressure required for operation, coupled with the resiliency of the cellular plastic, effects a successive distortion and release of any material which may have been picked up by the cells. The material is thus both non-logging and self-cleaning. In addition, the easily molded nature of the cellular plastic permits surface configurations which can enhance these characteristics (i.e., FIGURES 1 and 3). A further advantage of the cellular abrasive structures arises from its ability to act as a carrier for various solid, semisolid or liquid additives such as the detergents, lubricants, waxes, polishes and the like mentioned above. Such materials can either be picked up by sponge action or impregnation just prior to use, or can be permanently incorporated in the cellular structure during the manufacture of the device. The latter structures would be particularly effective in exposing the additive material continuously, and simultaneously with exposure of fresh abrasive surfaces, throughout the period of use.

To those skilled in the art to which this invention relates, many additional variations and embodiments and applications of the invention will suggest themselves without departing from the spirit and scope hereof. Thus, from a purely structural standpoint, the means of reinforcement, surface configuration, etc. shown in any of the illustrated embodiments, could be incorporated in the other embodiments to provide the obvious benefits of the alternate arrangement. For example, the reinforcement shown in the cylindrical wheels of FIGURES 11 to 18 could be substituted for the reinforcing shown in the surface finishing devices of FIGURES 1 to 10, without any significant alteration in the function of either, and vice versa. Similar structures to those broadly shown could also be successfully employed in abrading and polishing devices of the continuous belt or reciprocating type, or in hand rubs, cones, or in any other conventional configuration or shape, without substantially departing from the concepts of the invention. It should be understood therefore that the disclosures herein are intended to be illustrative and not limiting.

I claim:

1. A resilient abrasive wheel adapted to use in high speed rotary operations comprising in combination a body essentially formed of foamed resilient cellular polyurethane plastic, the void spaces of said foamed plastic being composed of substantially individualized cells of a size ranging from 0.005 to 0.125 inch, a substantially uniform dispersal of abrasive grit throughout said body, said grit being composed of substantially individualized particles of abrasive material ranging from about 0.010 to 0.130 inch so as to be of an average size at least as great as the average size of said cells, the void space represented by said cells constituting between 15 and 85% of the total volume of said body, the foamed portion of said body of polyurethane having a density of about 10 to 45 pounds per cubic foot.

2. An abrasive wheel as in claim 1 physically reinforced by a plurality of fibers selected from a group of natural and synthetic fibers extending through and embedded with said body.

3. An article as in claim 1 wherein said cells are substantially unicellular.

4. An article as in claim 1 wherein said cells are substantially intercommunicating.

5. An article as in claim 1 wherein a finely divided inorganic reinforcing filler selected from the group consisting of calcium carbonate, aluminum silicate clays, titanium dioxide, carbon blacks, and silica, is dispersed throughout said frame and polyurethane body.

6. An article as in claim 5 wherein said inorganic reinforcing filler has a particle size within the range from about 0.1 to 100 microns.

7. An article as in claim 1 wherein said wheel is provided with surface depressions forming paths extending outwardly from a position adjacent the central axis of said wheel, said outwardly extending paths acting to prevent clogging of the surfaces of said wheel during use.

8. An abrasive wheel comprising in combination a body of foamed resilient cellular polyurethane plastic, the void spaces of said foamed plastic being composed of substantially individualized cells of a size ranging from 0.005 to 0.125 inch, a substantially uniform dispersal of abrasive grit throughout said body, said grit being composed of substantially individualized particles of an average size at least as great as the average size of said cells, the void space represented by said cells constituting between 15 and 85% of the total volume of said body, the foamed portion of said body of polyurethane having a density of less than about 45 pounds per cubic foot, and reinforcement embedded within and extending throughout said body so as to be integral therewith, said reinforcement being in the form of a porous web which prevents distortion and the possibility of disintegration of said abrasive article during use.

9. An abrasive wheel as in claim 8 wherein said reinforcement is a cloth having abrasive grit bonded thereto.

10. An abrasive wheel as in claim 8 wherein said reinforcement is substantially individualized fibers extending throughout said foamed plastic body.

11. A resilient abrasive wheel as in claim 1 wherein said polyurethane body is formed as an outer member supported upon and partially enclosing a resilient rotary support.

12. A resilient abrasive wheel as in claim 1 wherein said cells of said body material contain an additive material selected from the group consisting of finely divided cork, vermiculite, perlite, graphite and diatomaceous earth, said additive material providing heat resistance and lubricating properties to said body.

References Cited by the Examiner

UNITED STATES PATENTS

| 1,986,849 | 1/1935 | Pohl et al. | 51—298 |
| 2,532,248 | 11/1950 | Upper et al. | 51—297 |
| 2,609,349 | 9/1952 | Wilson | 51—298 |
| 2,656,654 | 10/1953 | Erickson | 51—297 |
| 2,780,533 | 2/1957 | Hurst | 51—298 |
| 2,874,034 | 2/1959 | Rieke | 51—298 |
| 2,885,276 | 5/1959 | Upton | 51—298 |
| 2,876,085 | 3/1959 | Horie | 51—296 |
| 2,972,527 | 2/1961 | Upton | 51—298 |
| 2,977,330 | 3/1961 | Brower | 51—298 |

FOREIGN PATENTS 716,422 10/1954 Great Britain.

ALEXANDER H. BRODMERKEL, *Primary Examiner.*